Dec. 6, 1960 C. D. HOBSON 2,962,761
APPARATUS FOR MOLDING FLASHLESS RUBBER ARTICLES
Filed Jan. 9, 1959
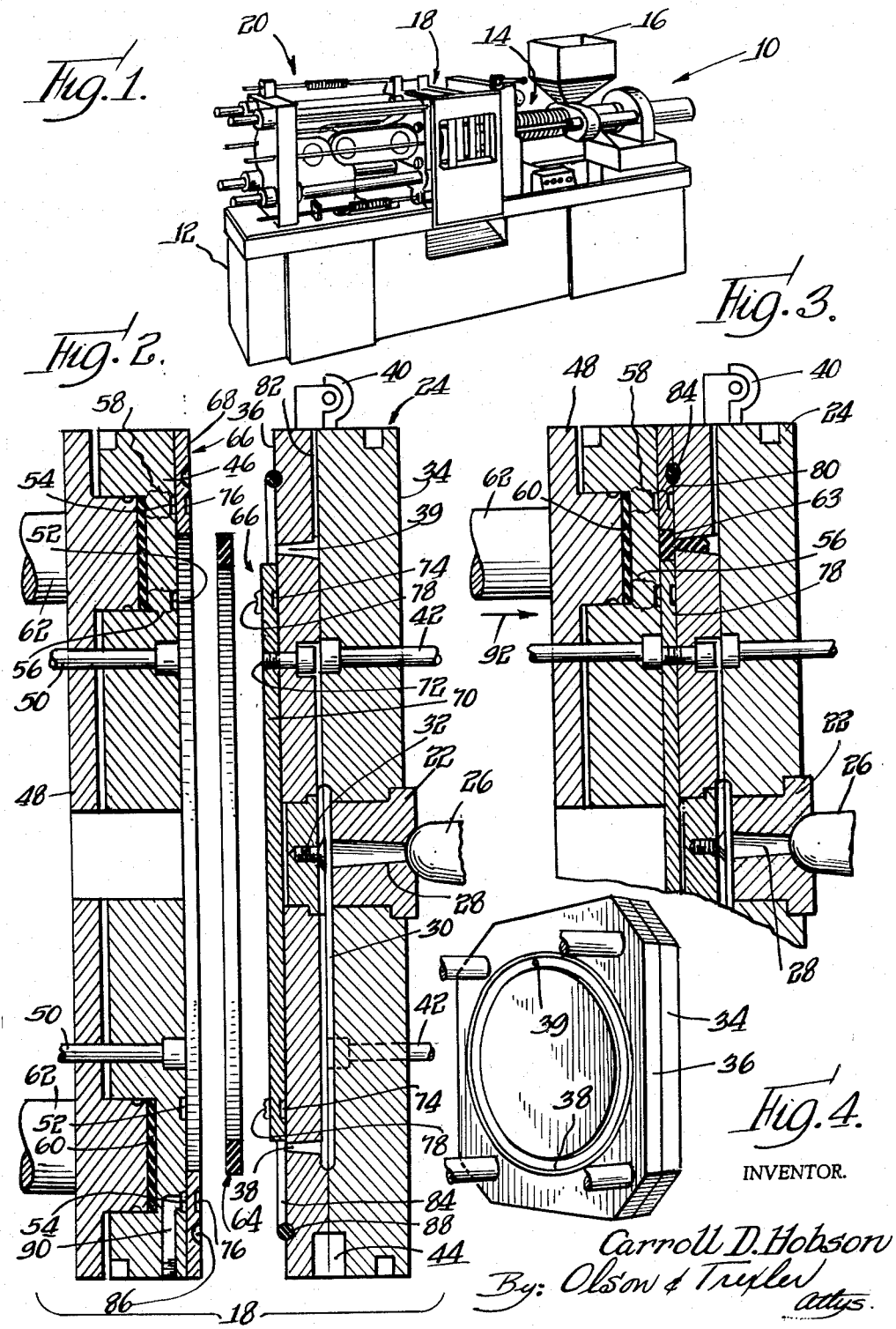
INVENTOR.
Carroll D. Hobson
By: Olson & Trexler
attys.

United States Patent Office 2,962,761
Patented Dec. 6, 1960

2,962,761

APPARATUS FOR MOLDING FLASHLESS RUBBER ARTICLES

Carroll D. Hobson, Goshen, Ind., assignor to Goshen Rubber Co., Inc., Goshen, Ind., a corporation of Indiana Filed Jan. 9, 1959, Ser. No. 785,900

8 Claims. (Cl. 18—42)

This invention relates generally to apparatus for molding rubber articles and more particularly to apparatus for molding rubber articles that are free of flash.

As is well known, flash is a thin fin of rubber formed at the sides of a molded part where some of the rubber has been forced between the faces of the molding dies. Such flash is especially undesirable in the case of mechanical molded goods because flash may prevent a mechanical part from fitting into its intended location or otherwise interfere with its proper functioning.

Heretofore, flash has been removed in various ways. Sometimes it is stripped away by the machine operator during the molding process. More often, manual trimming with scissors or knives is required. In certain instances, machines using punch-press operated dies have been employed. Rotating knives and belt or disk sanders are also used, depending upon the shape of the molded article.

Flash can also be removed by tumbling the molded items with pieces of Dry Ice, the frozen, brittle flash breaking away as the pieces knock together. Intricate parts may require the addition of pebbles or steel balls to the tumbling drum so as to remove flash from all areas. This method of flash removal is limited to moderately sized moldings having no thin sections which might break along with the flash since the flash, if too thick, may not break off smoothly. Furthermore, this method is not effective in removing flash from elastomeric compounds which are freeze-resistant.

The occurrence of flash can be related somewhat to the type of molding operation being employed. In compression molding, the dies are generally provided with a special flash or overflow groove to accommodate the excess compound which is charged so as to insure complete filling of the mold cavity. Flash is thereby encouraged in compression molding. On the other hand, in transfer molding, the dies, if machined with great precision at the parting surfaces, will not flash; and costly trimming operations may thereby be eliminated. However, the originally precisely machined molds soon become worn or distorted in use and some flashing generally is encountered. Insofar as flash is concerned, injection molding is ordinarily considered as a special type of transfer molding.

More recently, the concept of a flashless mold has been extended to include a mold having weakened sections which flex or provide a diaphragm action when the mold is subjected to pressure so as to pinch off the mold cavities where the mold faces come together. Additionally, transfer molds so arranged have the transfer pot broadened to form a pad for equalizing pressure across the face of the mold. By this combination, trimless, rather than true flashless, molding has been achieved, i.e. only minute amounts of flash are generally produced. In order to achieve true flashless molding, it has heretofore been necessary to taper the axial surfaces of the mold cavity in order to positively seal off the cavity at the mold parting lines.

Both trimless and true flashless transfer molding have a distinct economic disadvantage in that the "flash pad" used for equalizing the pressure must be discarded as scrap in each molding cycle, this pad being vulcanized concurrently with the article being molded.

Concomitant with the use of a flash pad for controlling diaphragm action is the inherent disadvantage of using the transfer or injection pressure of the rubber for clamping the mold together. This situation requires compromise from the ideal condition in a large number of molding situations. The clamping pressure needed to cut off the mold satisfactorily may not always be the most desirable pressure for injecting a particular rubber compound into the mold; and it is the injection pressure which controls, to a large degree, the speed with which the rubber compound is cured. The injection pressure is further related to the temperature to which the rubber must be preheated, to the temperature at which the mold must be maintained and to other factors necessary in developing the desired molding result.

Removing air from the mold is a somewhat related problem. Air has heretofore been removed from a mold cavity by the mere expedient of allowing such air to be pushed out between the faces of the mold ahead of the compound being charged. This scheme is disadvantageous particularly with respect to flashless molds because the escape path is considerably reduced by the diaphragm action through which the flashless operation has been made possible.

Therefore, an important object of the present invention is to provide an improved flashless mold.

Another object of the present invention is to provide a flashless mold which is of particular advantage for injection molding.

Yet another object of the present invention is to provide a flashless mold having a diaphragm action which is independent of the molding pressure.

A further object of the invention is to provide a true flashless mold in which it is unnecessary to provide tapering axial surfaces in the mold cavity.

A still further object of the invention is to provide improved air eliminating means for molding dies.

Additional objects and features of the invention pertain to the particular structure and arrangements whereby thhe above objects are obtained.

The structure in accordance with the invention includes a cover piece; a base piece which cooperates with the cover piece in defining a mold cavity and which includes weakened sections associated with points where flash might occur; and pressure distributing means for selectively opposing the weakened sections of the base piece.

The invention, both to its structure and mode of operation, will be better understood by reference to the following disclosure and drawings forming a part thereof, wherein:

Fig. 1 is a general view in perspective of an injection molding machine incorporating mold apparatus according to the present invention;

Fig. 2 is an exploded cross sectional view of mold apparatus in accordance with the present invention;

Fig. 3 is a fragmentary view in section of the mold apparatus of Fig. 2 showing the mold closed; and Fig. 4 is a perspective view of the cover piece of the mold apparatus of Fig. 2.

Referring now in detail to the drawings, specifically to Fig. 1, there is generally shown an injection molding machine or press 10 including a mount 12 which encloses a power unit and certain other operating devices. An extruding mechanism 14 comprised of a screw and a barrel, not shown, is driven by the power unit enclosed in mount 12 so as to heat and force the elastomeric compound from feed hopper 16 to the flashless molding die shown generally at 18. In order to securely close die 18 against the injection pressure developed in mechanism 14, a mold clamping apparatus 20 is secured to the mount 12 to be operated appropriately by the power unit therein.

The term "flashless" as applied above to die 18 and as used hereinafter is intended to refer to true flashless molding wherein flash is completely prevented. The term "trimless" will be used for molding operations in which minute amounts of flash are produced.

As shown in Fig. 2, molding die 18 includes a sprue unit 22 which is contained within the cover piece or platen shown generally at 24. Unit 22 is adapted to engage the nozzle 26 of extrusion mechanism 14. The sprue 28 of unit 22 communicates between nozzle 26 and the runner 30 contained within cover piece 24. In order to facilitate removal of that quantity of elastomer which is vulcanized in sprue 28 during each molding cycle, there is advantageously provided an under-cut sprue puller 32.

Cover piece 24 may be assembled from an upper member 34 and a lower member 36 so that the runner 30 and the gates 38 and 39 may be easily fashioned therein. Upper member 34 and lower member 36 may be conveniently joined as by a hinge 40. The cover piece 24 formed thereby may be fastened to press 10 by bolts 42; and when cover plate 24 is so constructed, it is advantageous to provide a pry slot 44 for use in separating the members 34 and 36 in order to remove the vulcanizate developed in runner 30 and gates 38 and 39 during each molding cycle.

Additionally, a base piece or platen 46 is slidably mounted to a plunger 48 as on bolts 50. The bolts 50 may be advantageously headed at both ends in order to prevent platen 46 from slipping out of engagement with plunger 48.

In order to provide a diaphragm or flexing action of the mold whereby flash can be obviated, base piece 46 is provided with a first notched channel 52 corresponding to the inner perimeter of the article being molded and a second notched channel 54 corresponding with the outer perimeter of that article. Notched channel 52 defines a weakened section 56, whereas notched channel 54 defines a weakened section 58.

It is these weakened sections which permit the deflection of base piece 46 that cuts off the mold cavity to eliminate flash. The depth and shape of the notched channels 52 and 54 provide information which permits calculation, and thereby control, of the deflection which will be experienced by the base piece 46. Such calculations follow the rules well known to those skilled in the art of mold design.

Since the problem of reducing or eliminating flash involves equalizing pressure across the face of the mold, plunger 48 is provided with a pressure distributing pad 60 selectively supporting base piece 46 in alignment with the weakened sections 56 and 58. Pad 60 may be a quantity of hydraulic oil, for example, or it may be some other suitable material such as rubber; and in one particular embodiment of the invention, it has proved advantageous to form pad 60 from a silicone rubber compound. Pad 60 becomes an integral permanent part of the molding apparatus.

Plunger 48 is suitably affixed to press 10 as by means of shafts 62 and is desirably spaced-apart from base piece 46 so as to permit proper functioning of the pad 60.

As an aid in defining a mold cavity 63, best shown in Fig. 3, for the workpiece or article 64 being molded, there is included an intermediate mold piece 66 comprised of sub-unit 68 suitably affixed to base 46 and sub-unit 70 affixed to cover piece 24 in some suitable manner, such as by bolt 72.

Sub-unit 70 is advantageously provided with a notched channel 74 corresponding with notched channel 52, whereas sub-unit 68 is provided with a notched channel 76 corresponding with notched channel 54. By means of the channels 74 and 76, weakened sections 78 and 80 respectively are created in order to further facilitate eliminating flash on the workpiece 64. In this regard, it is important to point out that sub-unit 68 should not be so tightly affixed to base piece 46 that flexing of the weakened section 80 is inhibited. Likewise, sub-unit 70 should not be so tightly affixed to cover piece 24 that flexing about weakened section 78 is inhibited.

Workpiece 64 is shown as a simple ring of rectangular cross-section. However, this showing should not be construed as limiting the invention to molding only such parts. Any number of other shapes may be equally as well molded employing the present invention.

As is well known, air must be exhausted from the mold cavity ahead of the compound being charged. One conventional means for allowing air to escape is by communicating outlet gate 39 with the atmosphere as by means of groove 82. However, according to an important feature of the present invention, no such groove is provided. Rather, the mold cavity 63 is sealed off from the atmosphere; and in order to implement such sealing, there is provided a resilient member 84 which may conveniently take the form of a rubber O-ring. In such instance, groove 86 may be appropriately formed in sub-unit 68 and groove 88 in lower member 36 so as to receive member 84.

In order to exhaust air and other gases from the cavity of a mold so sealed off, there is provided a tube 90 connected to a source of vacuum not shown, which tube may be conveniently threaded internally for such purpose. Tube 90 is adapted to communicate with the mold cavity 63, as through notched channel 54 and the minute channels of the microfinish which may be advantageously provided on the lands of base piece 46, for example.

By way of describing the operation of the illustrated embodiment of the present invention, it is advantageous to refer now particularly to Fig. 3. With the molding apparatus closed as shown, clamping pressure may be independently applied thereto as by urging piston 48 in the direction of arrow 92 under the influence of shafts 62. The force thus applied is distributed across the face of the mold by means of the pad 60. In response, base piece 46 will flex about the weakened sections 56 and 58 and the intermediate mold piece 66 will flex about sections 78 and 80, by which action the mold cavity will be pinched or cut off at all the parting lines associated therewith.

In this condition, the mold is ready to receive the vulcanizate; and accordingly, extrusion mechanism 14 is directed to deliver an appropriate quantity of the heated and masticated compound to mold cavity 63 by means of nozzle 26, sprue 28, runner 30 and gate 38. In order to complete vulcanization of the charged compound, a number of platen heaters, not shown, may conveniently be employed in providing the necessary heat.

When the compound has cured, the molding cycle may be completed by withdrawing base piece 46 and stripping the finished article 64 from the mold.

As is shown, the resilient member 84 is compressed in order to seal off the mold from the atmosphere when the plunger 48 is urged in the direction of arrow 92. Appropriately, air and any other gases present may be exhausted through the tube 90 prior to and during charging of the vulcanizable compound.

While a particular embodiment of the invention has been shown with specific reference to injection molding, it will be understood, of course, that the invention is not limited thereto since many modifications may be made, for example, the invention may be adapted to transfer molding or the invention may be arranged to provide trimless articles. It is, therefore, contemplated to cover by the appended claims any such modifications as fall within the true spirit of the scope of the invention.

The invention is claimed as follows:

1. Apparatus for molding flashless rubber articles comprising: a cover piece; a base piece cooperating with said cover piece in defining a mold cavity, said base piece including weakened sections arranged adjacent to and spaced apart from the parting lines of said mold cavity; and pressure distributing means slideably engageable with said base piece for selectively opposing said weakened sections, so constructed and arranged that the base piece will flex about said weakened sections under the clamping pressure applied to said cover piece and said base piece thereby cutting off said mold cavity along the parting lines so as to eliminate flash on said molded articles.

2. Apparatus for molding flashless rubber articles comprising: a cover piece including a sprue, a runner and gate; a base piece cooperating with said cover piece in defining a mold cavity, said base piece including weakened sections arranged adjacent to and spaced apart from the parting lines of said mold cavity; and pressure distributing means including a resilient pad driven by a plunger slideably engageable with said base piece for selectively applying pressure to said weakened sections, so construed and arranged that the base piece will flex about said weakened section under the clamping pressure applied to said cover piece and said base piece thereby cutting off said mold cavity along the parting lines so as to eliminate flash on said molded articles.

3. Apparatus for molding flashless rubber articles comprising: a cover piece including a sprue, a runner and gates, a base piece cooperating with said cover piece in defining a mold cavity, said base piece including weakened sections arranged adjacent to and spaced apart from the parting lines of said mold cavity; and pressure distributing means including a hydraulic ram slideably engageable with said base piece for selectively applying pressure to said weakened sections, so constructed and arranged that the base piece will flex about said weakened sections under the clamping pressure applied to said cover piece and said base piece thereby cutting off said mold cavity along the parting lines so as to eliminate flash on said molded articles.

4. Apparatus for molding flashless rubber articles comprising: a cover piece including a sprue, a runner and gates; a base piece cooperating with said cover piece in defining a mold cavity, said base piece including weakened sections arranged adjacent to and spaced apart from parting lines of said mold cavity; pressure distributing means including a silicone rubber pad mounted on a plunger slidably engageable with said base piece for selectively applying pressure to said weakened sections, so constructed and arranged that the base piece will flex about said weakened section under the pressure applied thereto by said pressure distributing means thereby cutting off said mold cavity along the parting lines so as to eliminate flash on said molded articles.

5. Apparatus for molding flashless rubber articles comprising: a cover piece including a sprue, a runner and gates; a base piece cooperating with said cover piece in defining a mold cavity, said base piece including sections weakened by channels formed in the lands and arranged adjacent to and spaced apart from the parting lines of said mold cavity; and pressure distributing means including a silicone rubber pad mounted on a plunger slideably engageable with said base piece for selectively applying pressure to said weakened sections, so constructed and arranged that the base piece will flex about said weakened sections under the clamping pressure applied thereto by said pressure distributing means thereby cutting off said mold cavity along the parting lines so as to eliminate flash on said molded articles.

6. Apparatus for molding flashless rubber articles comprising: a cover piece including a sprue, a runner, and gates; a base piece cooperating with said cover piece in defining a mold cavity, said base piece including weakened sections arranged adjacent to and spaced apart from the parting lines of said mold cavity, an intermediate piece interposable between said cover piece and said base piece for further defining said mold cavity, said intermediate piece including weakened sections aligned with the weakened sections of said base piece; and pressure distributing means including a silicone rubber pad mounted on a plunger slideably engageable with said base piece for selectively applying pressure to said weakened sections, so constructed and arranged that the base piece and the intermediate piece will flex about said weakened sections under the clamping pressure applied thereto by said pressure distributing means thereby cutting off said mold cavity along the parting lines so as to eliminate flash on said molded articles.

7. Apparatus for molding trimless rubber articles comprising: a cover piece; a base piece cooperating with said cover piece in defining a mold cavity, said base piece including weakened sections arranged adjacent to and spaced apart from the parting lines of said mold cavity; and pressure distributing means slideably engageable with said base piece for selectively opposing the weakened sections thereof, so constructed and arranged that the base piece will flex about said weakened sections under the clamping pressure applied to said cover piece and said base piece thereby cutting off said mold cavity along the parting lines so as to minimize flash on said molded article.

8. A mold device comprising: a cover platen; a base platen cooperating with said cover platen in defining a mold cavity and having weakened sections corresponding with all points which are to be cut off to eliminate flash; and pressure distributing means for selectively applying pressure to the weakened sections of said base platen whereby said base platen will flex under said pressure to cut off said mold cavity along the parting lines.

References Cited in the file of this patent

UNITED STATES PATENTS

| | | |
|---|---|---|
| 2,473,284 | Knaggs | June 14, 1949 |
| 2,607,080 | Stewart | Aug. 19, 1952 |
| 2,772,012 | Crabtree | Nov. 27, 1956 |

Notice of Adverse Decision in Interference

In Interference No. 91,874 involving Patent No. 2,962,761, C. D. Hobson, Apparatus for molding flashless rubber articles, final decision adverse to the patentee was rendered Feb. 19, 1963, as to claim 8.

[*Official Gazette July 23, 1963.*]